United States Patent
Chen et al.

(10) Patent No.: US 10,027,777 B2
(45) Date of Patent: Jul. 17, 2018

(54) WEB PAGE PRE-LOADING OPTIMIZATION

(71) Applicant: International Business Machines Corporation, Armonk, NY (US)

(72) Inventors: Hao Chen, Beijing (CN); Ya Bin Dang, Beijing (CN); Feng Li, Beijing (CN); Shao Chun Li, Beijing (CN); Xin Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 308 days.

(21) Appl. No.: 14/924,924

(22) Filed: Oct. 28, 2015

(65) Prior Publication Data

US 2016/0156732 A1 Jun. 2, 2016

(30) Foreign Application Priority Data

Nov. 27, 2014 (CN) .......................... 2014 1 0706711

(51) Int. Cl.
*G06F 15/16* (2006.01)
*H04L 29/08* (2006.01)
*G06F 17/30* (2006.01)

(52) U.S. Cl.
CPC .... *H04L 67/2847* (2013.01); *G06F 17/30902* (2013.01); *H04L 67/02* (2013.01); *H04L 67/32* (2013.01)

(58) Field of Classification Search
CPC . G06F 8/433; G06F 8/75; G06F 8/443; G06F 8/34; G06F 11/3604; G06F 11/3688; G06F 8/70; G06F 8/71; G06F 9/30036; G06F 9/30072
See application file for complete search history.

(56) References Cited

U.S. PATENT DOCUMENTS

| 8,516,360 B2 | 8/2013 | Mondal et al. | |
| 8,713,586 B2 | 4/2014 | Kieffer | |
| 2009/0055545 A1* | 2/2009 | Saba | G06Q 10/10 709/229 |
| 2012/0030338 A1* | 2/2012 | Zhang | G06F 11/3419 709/223 |
| 2012/0136853 A1* | 5/2012 | Kennedy | G06F 17/30038 707/723 |

(Continued)

OTHER PUBLICATIONS

"A JavaScript Preloader for HTML5 Apps", Pixel Lab, http://thinkpixellab.com/pxloader/, retrieved from the Internet Aug. 5, 2015, 13 pages.

(Continued)

*Primary Examiner* — Djenane Bayard
(74) *Attorney, Agent, or Firm* — Francis Lammes; Stephen J. Walder, Jr.; Mercedes L. Hobson

(57) ABSTRACT

A mechanism is provided for optimizing web page preloading. Source codes of a web page file are analyzed to generate a module dependency graph that describes load dependency relationships between respective modules in the web page file. A load flow graph that indicates load flows of respective modules in the web page file is generated based on the module dependency graph. The load flow graph and the module dependency graph are analyzed to determine pre-load sequences of respective modules in the web page file. A pre-load profile is then generated based on the determined pre-load sequences.

14 Claims, 12 Drawing Sheets

(56) References Cited

U.S. PATENT DOCUMENTS

| | | | |
|---|---|---|---|
| 2012/0151455 A1* | 6/2012 | Tsantilis | G06F 11/3688 |
| | | | 717/132 |
| 2012/0167122 A1 | 6/2012 | Koskimies | |
| 2013/0007016 A1* | 1/2013 | Saxena | G06F 17/30902 |
| | | | 707/748 |
| 2013/0073401 A1 | 3/2013 | Cook | |
| 2013/0191439 A1 | 7/2013 | Kern et al. | |
| 2014/0109106 A1 | 4/2014 | Fanning et al. | |
| 2016/0014091 A1* | 1/2016 | Hiltch | H04L 67/2814 |
| | | | 726/30 |

OTHER PUBLICATIONS

Skinner, G., "PreloadJS", CreateJS, http://www.createjs.com/#!/PreloadJS, retrieved from the internet Aug. 5, 2015, 4 pages.

Maras, Josip et al., "Client-side Web Application Slicing", IEEE Computer Society, Proceedings of the 2011 26th IEEE/ACM International Conference on Automated Software Engineering (ASE 2011), Nov. 6-10, 2011, Lawrence, Kansas, pp. 504-507.

* cited by examiner

WEB PAGE PRE-LOADING OPTIMIZATION

BACKGROUND

The present invention relates to the field of electronic apparatus, and more specifically, to a method for optimizing web page pre-loading and an apparatus to implement the method.

Currently, Internet has become an indispensable part of life. A variety of websites providing diversified contents and functions have emerged to meet various needs of people.

However, along with the diversified contents and functions of websites, web page file is growing. The reason is that the web page file includes applications for achieving various functions, such as JavaScript application. In order to provide more functions, the number and code amount of JavaScript application are also growing.

So it results in the problem that when users access the websites, the time required to load each web page is longer, which leads to poor use experience of the user.

For the above, it is desirable to provide a method and an electronic apparatus for optimizing web page pre-loading, which can effectively reduce the time to load a web page, thereby improving use experience of the user.

SUMMARY

According to one embodiment of the present invention, there is provided a method for optimizing web page pre-loading, being applied to an electronic apparatus, the method comprising: analyzing source codes of a web page file to generate a module dependency graph that describes load dependency relationships between respective modules in the web page file; generating a load flow graph that indicates load flows of respective modules in the web page file based on the module dependency graph; analyzing the load flow graph and the module dependency graph to determine pre-load sequences of the respective modules in the web page file; and generating a pre-load profile based on the determined pre-load sequences.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
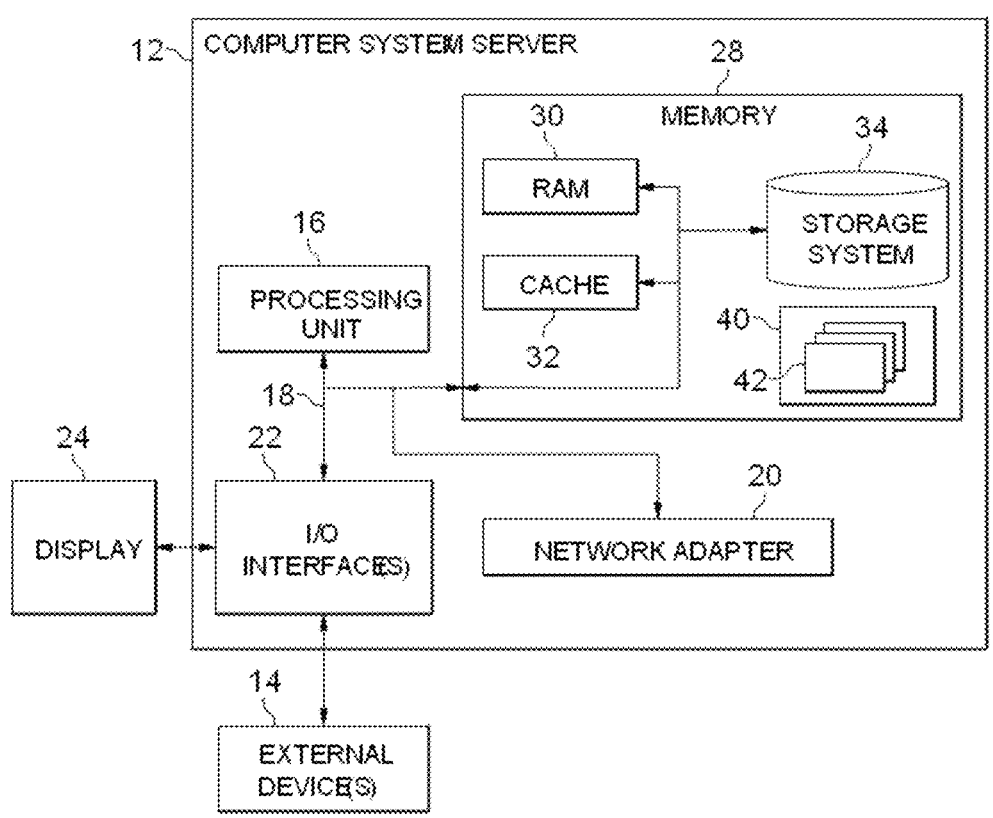
FIG. 1 shows an exemplary computer system/server 12 which is applicable to implement the embodiments of the present invention.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
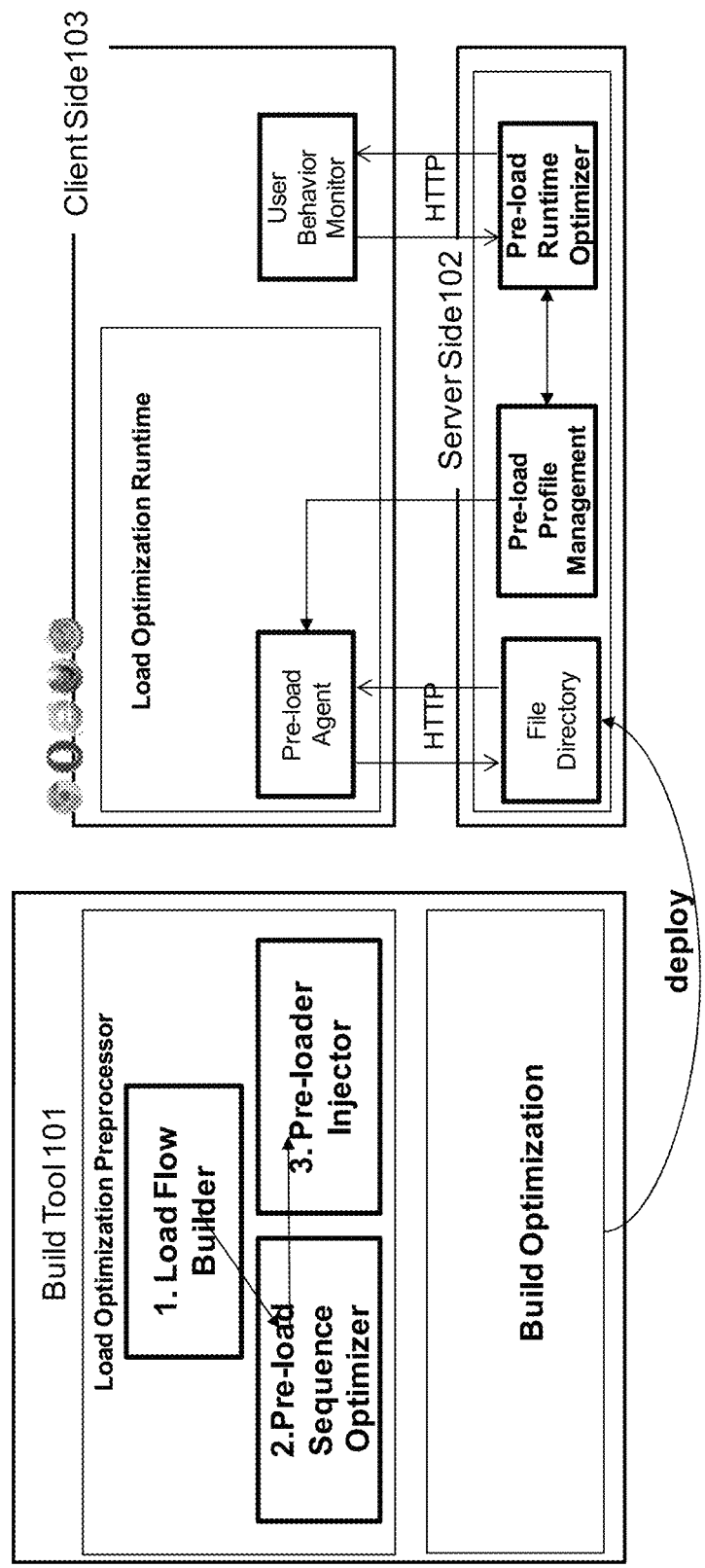
FIG. 2 shows a structure diagram of a system for optimizing web page pre-loading according to a first embodiment of the present invention.

With reference now to FIG. 2, FIG. 2 shows a structure diagram of a system 100 for optimizing web page pre-loading according to a first embodiment of the present invention.

As shown in FIG. 2, the system 100 according to the first embodiment of the present invention comprises three sections: the first section 101 is an electronic apparatus (i.e., which may also be referred to as a build tool) that builds and deploy a web page; the second section 102 is a server that provides the web page to a client; and the third section 103 is a client electronic apparatus by which the user accesses the web page.

The build tool 101 builds the web page file, generates a pre-load profile for pre-loading and a user agent application for a client, and deploys them to the server 102 after finishing the building of these files.

The server 102 receives the web page file deployed by the build tool 101, transmits the pre-load profile and the user agent application to the client 103, and receives user use information fed back by the client.

The client 103 accesses a web page in the server by using the user agent application, and performs pre-loading based on the pre-load profile. Meanwhile, the client 103 monitors and makes statistics of user use information and feeds it back to the server 102.

Figure 3:
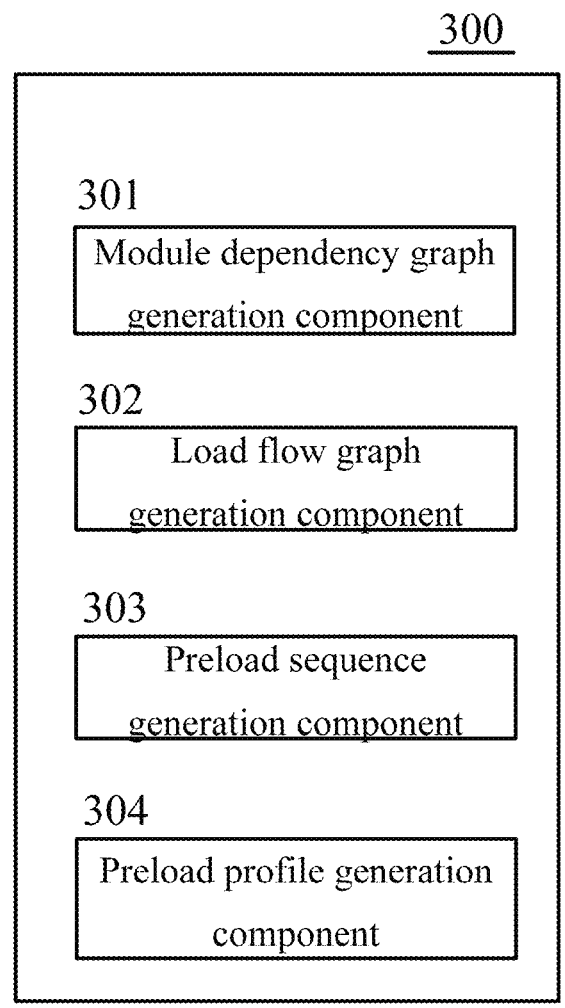
FIG. 3 shows a block diagram of function configuration of an electronic apparatus for optimizing web page pre-loading according to a second embodiment of the present invention.

Specifically, as shown in FIG. 3. FIG. 3 shows a block diagram of function configuration of an electronic apparatus 300 for optimizing web page pre-loading according to a second embodiment of the present invention.

The electronic apparatus 300 comprises the following modules. A module dependency graph generation component 301 is configured to analyze source codes of a web page file to generate a module dependency graph that describes load dependency relationships between respective modules included in the web page file. A load flow graph generation component 302 is configured to generate a load flow graph that indicates load flows of respective modules in the web page file based on the module dependency graph. A pre-load sequence generation component 303 is configured to analyze the load flow graph and the module dependency graph to determine pre-load sequences of respective modules in the web page file. A pre-load profile generation component 304 is configured to generate a pre-load profile based on the determined pre-load sequences.

A method for optimizing web page pre-loading as implemented on the electronic apparatus 300 will be described in detail below.

Figure 4:
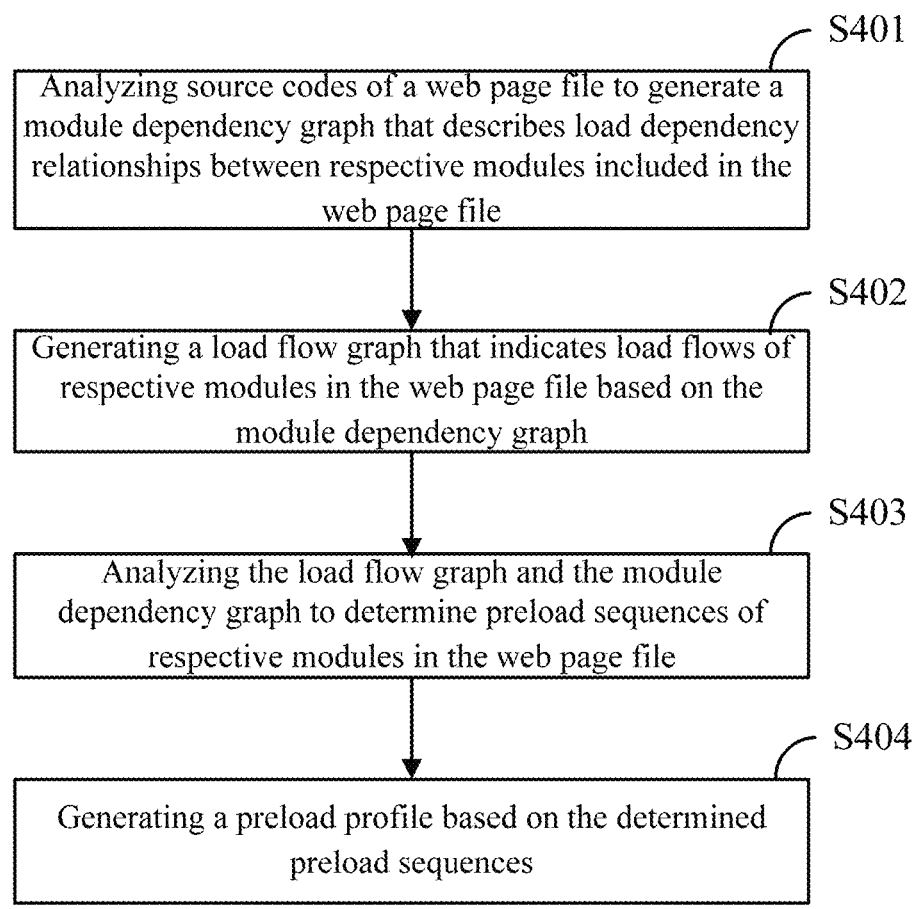
FIG. 4 shows a flow chart of a method for optimizing web page pre-loading as implemented in the electronic apparatus according to the second embodiment of the present invention.

As shown in FIG. 4. FIG. 4 shows a flow chart of a method for optimizing web page pre-loading as implemented in the electronic apparatus 300 according to the second embodiment of the present invention.

The method 400 comprises the following steps. In step S401, source codes of a web page file is analyzed to generate a module dependency graph that describes load dependency relationships between respective modules included in the web page file. In step S402, a load flow graph that indicates load flows of respective modules in the web page file is generated based on the module dependency graph. In step S403, the load flow graph and the module dependency graph are analyzed to determine pre-load sequences of respective modules in the web page file. In step S404, a pre-load profile is generated based on the determined pre-load sequences.

Specifically, with the growing size of the web page file, waiting time becomes longer and longer when page is loaded. In order to reduce the time during which the user waits page to be loaded, it is possible to consider pre-loading necessary or critical elements (modules) in a web page, rather than loading all the elements (modules) at the same time.

In particular, in order to provide more contents and richer functions for a web page, there are more and more numbers of JavaScript application. JavaScript application has a dependency on loading of one or more other script programs when being loaded and executed. That is to say, when loading and executing a specific JavaScript application, it is required that one or more other script programs should have already been loaded.

However, as well known by those skilled in the art, considering file transmission efficiency during issuing of a web page, a large number of JavaScript applications will be combined and compressed to generate a compressed file package in a construction (build) stage, so as to improve transmission efficiency. Therefore, even if the user manually predefines which JavaScript applications and/or resources need to be pre-loaded when compiling JavaScript applications and the web page file, these JavaScript applications are recombined and recompressed during the building, so as to generate one or several files, which leads to failure of some original definitions.

To this end, the present invention performs active pre-loading of the elements (modules) in the web page by means of predicting the page browsing order in the construction (build) stage and analyzing correlation of codes of different elements in the page, thereby reducing the time to load a page.

Therefore, at step S401, it is possible to analyze source codes of a web page file to generate a module dependency graph that describes load dependency relationships between respective modules included in the web page file.

Figure 5:
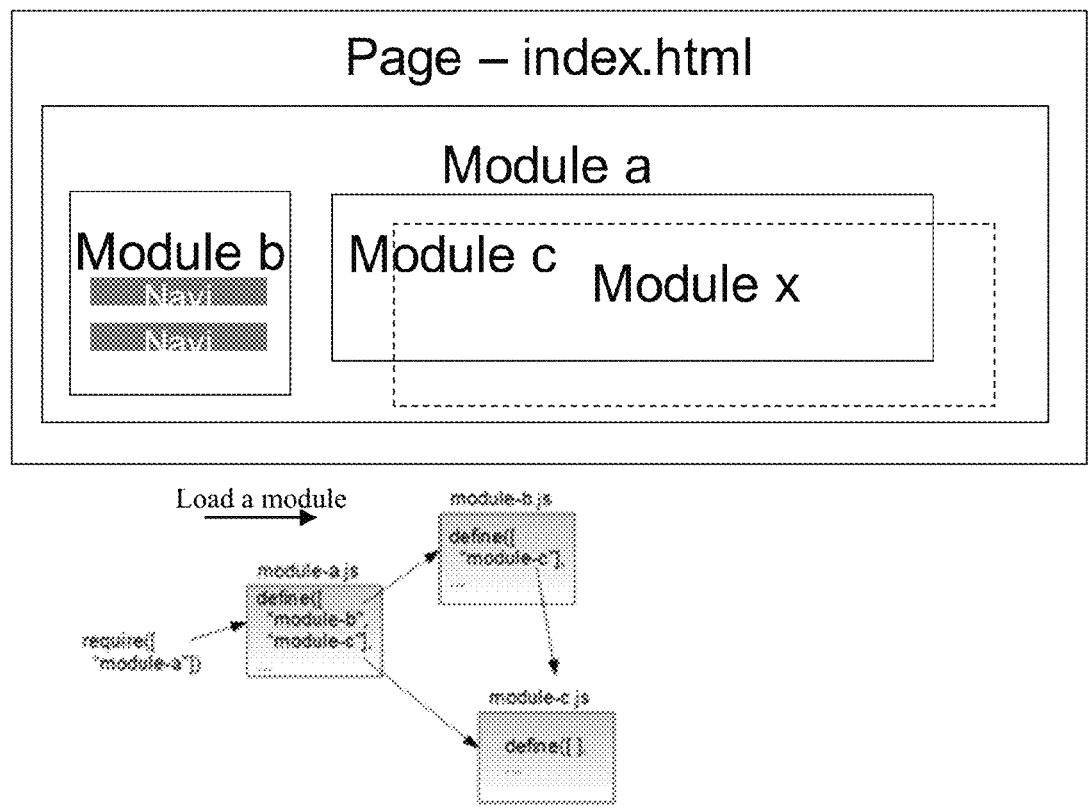
FIG. 5 shows an example of page elements based on JavaScript application.

The module dependency graph will be described in detail below with reference to FIGS. 5 and 6. FIG. 5 shows a typical example of page elements based on JavaScript application.

As shown in FIG. 5, it is assumed that a home page includes one Module a. Module b and Module c are defined in Module a, and Module c is defined in Module b.

In a first stage, when page is initialized, first, Module a in the home page is loaded, in this case it is found out that Module b and Module c need to be loaded, then it starts to load Module b and Module c. Thereafter, it starts to execute Module c.

Next, in a second stage, when the user performs an interactive operation, it starts to load Module x, and also starts to execute Module x to perform an interactive operation.

When there are a small number of modules, it is possible for the user to manually define load sequences of respective modules to execute initialization. However, when the number of modules in the web page exceeds a certain amount (such as tens or hundreds), it is impossible for the user to define the load sequence of each module, because each module may probably involve a dependency on other modules.

Therefore, it is required to be capable of analyzing codes of a web page to determine the module dependency graph between respective modules.

Specifically, source codes of the web page file is analyzed to determine nodes and edges in the web page file. The node indicates a module in the web page file. The edges include real edges and virtual edges. The real edge has a direction, and a real edge from one node to another node indicates that the one node always depends on the another node. The virtual edge has a direction, and a virtual edge from one node to another node indicates that the one node depends on the another node only in certain conditions. Further, a weight may be set on an edge, the weight indicates the number of dependency paths. And then the module dependency graph is generated based on the determined node and edge.

Figure 6:
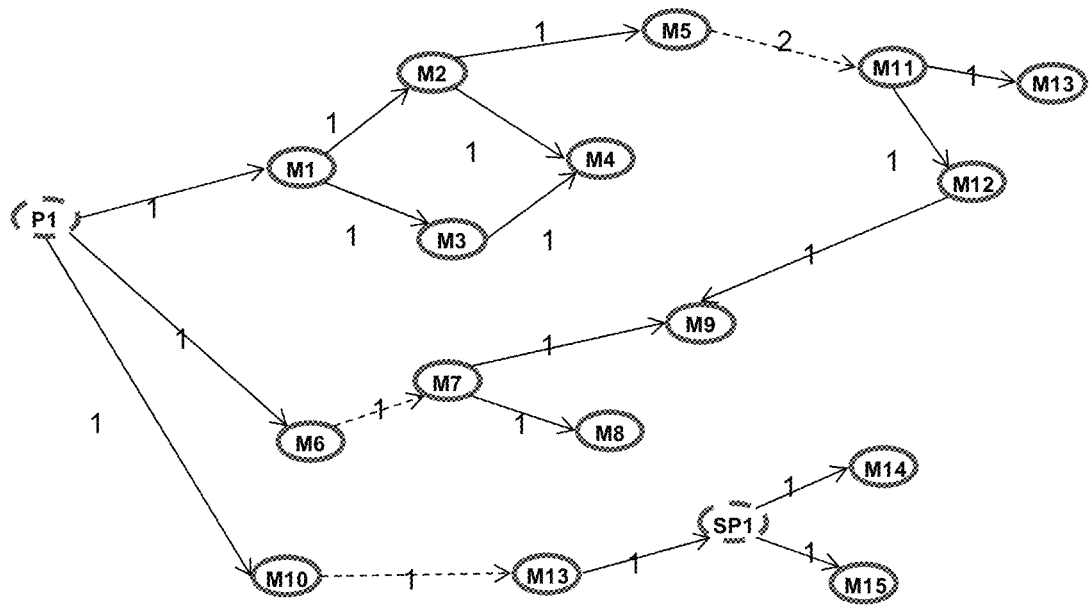
FIG. 6 shows an example of a module dependency graph.

As shown in FIG. 6, FIG. 6 shows an example of a module dependency graph. In FIG. 6, P1 indicates a root node (such as, a home page), the home page includes modules M1-M15 called as real nodes and real edges with directions (as shown by the solid-line arrows in FIG. 6). Further, the home page also includes a sub page SP1 called as a virtual node and virtual edges with directions (as shown by the dotted-line arrows in FIG. 6). The real node indicates a module in the page (module node), and the virtual node indicates a page example (page node). A real edge from one node to another node indicates that the one node always depends on the another node (synchronized dependency), for example, the solid-line arrow pointing from P1 to M1, the solid-line arrow pointing from M1 to M2, and so on. Further, a virtual edge from one node to another node indicates that the one node depends on the another node only in certain conditions (asynchronous dependency), for example, the dotted-line arrow pointing from M5 to M11, the dotted-line arrow pointing from M6 to M7, and so on. The certain conditions for example include an asynchronous request, a function, and so on. In addition, each edge has a weight, whose value may be for example set as one. However, the weight on the edge may also be adjusted, for example, it is possible to adjust according to user use information (including use frequency, use preference information, and so on), file size and so on.

By analyzing source codes of the whole web page file, it is possible to determine each node and edge in the web page file, thereby generating a module dependency graph. It should be noted that, the method of analyzing source codes of a web page file to determine the nodes and edges in the web page file is well known by those skilled in the art, detailed descriptions thereof are omitted here.

After the module dependency graph is generated at step S401, a load flow graph is generated based on the module dependency graph at step S402.

Specifically, all virtual edges are removed from the module dependency graph to obtain a corrected module dependency graph. All roots are identified from the corrected module dependency graph. For each root, its transitive closure in the corrected module dependency graph is identified. For each identified transitive closure, a node in the load flow graph is generated, the node in the load flow graph including all modules in the transitive closure. For each pair of nodes in the load flow graph (LFG_Ni, LFG_Nj), if there is at least one virtual edge in the module dependency graph from a module in one node (LFG_Ni) to a module in another node (LFG_Nj), then a directional edge from the one node (LFG_Ni) to the another node (LFG_Nj) is generated, and a weight on this edge is a total weight on the corresponding virtual edges. For each pair of nodes in the load flow graph (LFG_Ni, LFG_Nj), if they have a common module, a link between the one node (LFG_Ni) and the another node (LFG_Nj) is generated. And the load flow graph is generated, with the node in the load flow graph as a minimal loading unit.

Figure 7:
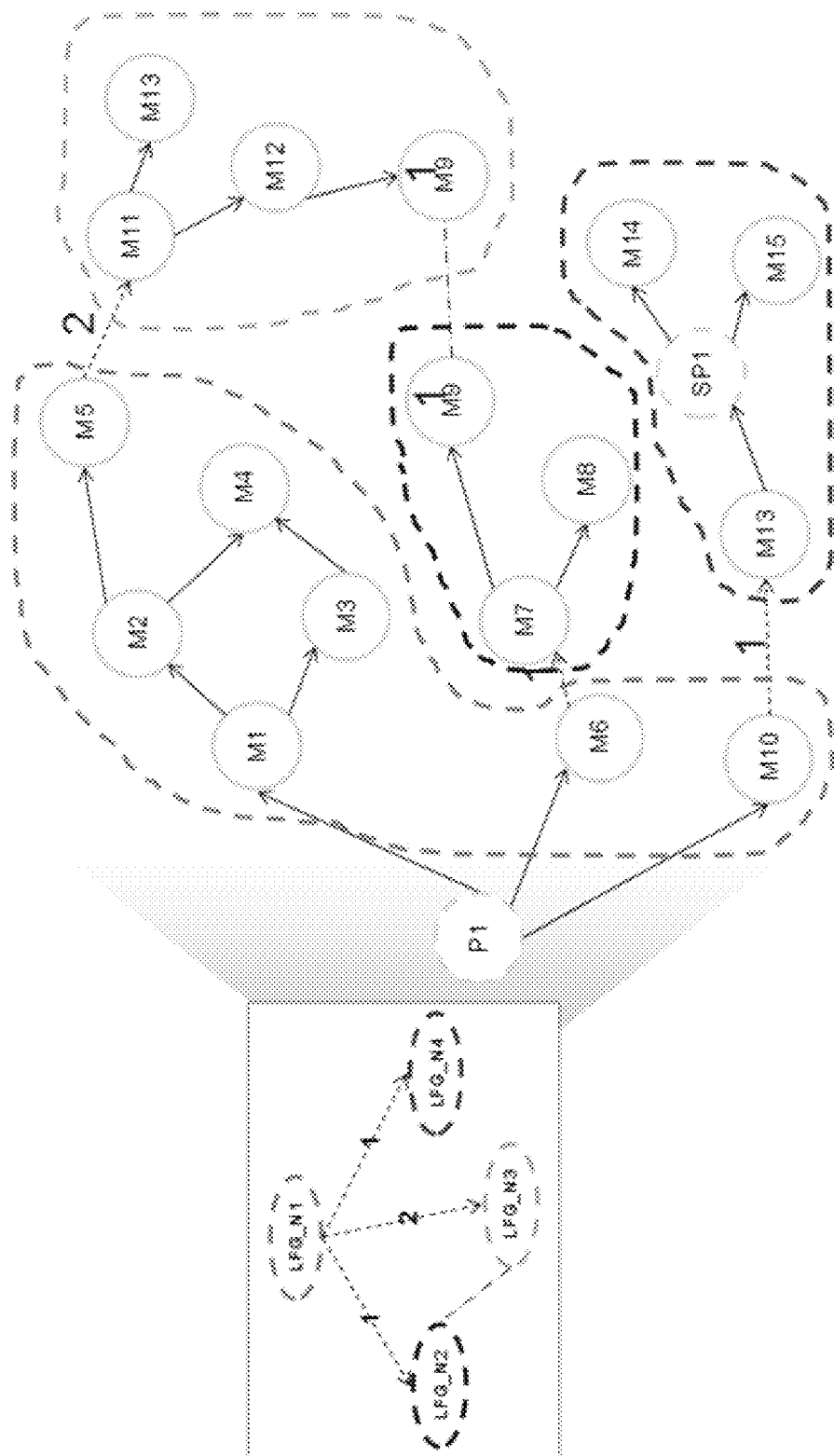
FIG. 7 shows an example of generating a load flow graph.

In particular, FIG. 7 shows an example of generating a load flow graph. As shown in FIG. 7, first, all virtual edges are removed from the module dependency graph to obtain a corrected module dependency graph, that is, the virtual edge pointing from M5 to M11, the virtual edge pointing from M6 to M7, the virtual edge pointing from M10 to M13.

Next, all roots are identified from the corrected module dependency graph. For example, M1, M6, M10 and M7, M11 and M13.

Thereafter, for each root, its transitive closure is identified in the corrected module dependency graph. As well known by those skilled in the art, the transitive closure is a definition in graph theory. For example, for a node i, if j can arrive at i, i can arrive at k, then j can arrive at k. The transitive closure is obtained to select all the nodes that satisfy a transitive property in the graph, after calculation is completed, whether two nodes are linked can be known.

As shown in FIG. 7, M7, M8, and M9 constitute the transitive closure (LFG_N2) of M7, M13, SP1, M14, and M15 constitute the transitive closure (LFG_N4) of M13, M11, M12, M13, and M9 constitute the transitive closure (LFG_N3) of M11. M1-M5 constitute the transitive closure of M1.

It should be noted that, because M1, M6, and M10 belong to nodes in a parallel stage under the home page P1, that is to say, when the home page P1 is initialized, the three nodes M1, M6, and M10 need to be loaded simultaneously, the three nodes and their transitive closures therefore constitute a transitive closure (LFG_N1).

Next, for each identified transitive closure, a node in the load flow graph is generated, the node in the load flow graph includes all modules in the transitive closure. That is to say, each identified transitive closure is taken as a node in the load flow graph. Four nodes are generated in FIG. 7, i.e., LFG_N1-LFG_N4.

Thereafter, for each pair of nodes in the load flow graph (LFG_Ni, LFG_Nj), if there is at least one virtual edge in the module dependency graph from a module in one node (LFG_Ni) to a module in another node (LFG_Nj), then a directional edge from the one node (LFG_Ni) to the another node (LFG_Nj) is generated, and a weight on this edge is a total weight on the corresponding virtual edges. As shown in FIG. 7, in the load flow graph, there are four virtual edges, i.e., the virtual edge pointing from LFG_N1 to LFG_N2, its weight is one, a virtual edge pointing from LFG_N1 to LFG_N3, its weight is two, and a virtual edge pointing from LFG_N1 to LFG_N4, its weight is one.

And then, for each pair of nodes in the load flow graph (LFG_Ni, LFG_Nj), if they have a common module (a shared module), a link between the one node (LFG_Ni) and the another node (LFG_Nj) is generated. The link refers to, in the case that a common dependency exists in the dependency relationships, a line that connects a copy of the part that is depended on in common with an original part, and it can be used to track a copy of the common dependency in terms of data structure. As shown in FIG. 7, in the load flow graph, for example, a shared module M9 exits between LFG_N2 and LFG_N3, thus there is a link between LFG_N2 and LFG_N3. The two modules M9 in FIG. 7 indicate the same module, the module M9 is shared by LFG_N2 and LFG_N3.

After the above analyzing processing is completed, the load flow graph is generated with the node in the load flow graph as a minimal loading unit.

After the load flow graph is generated at step S403, the load flow graph and the module dependency graph are analyzed to determine pre-load sequences at step S404.

Specifically, for each minimal loading unit, the shortest path from it to a root is determined, in which the root refers to a first page of an application or a root in the load flow graph. For each minimal loading unit, its level is determined based on the shortest path from it to a root, wherein level=a length of the shortest path. In this embodiment, the shorter the path is, the higher the priority is.

For each minimal loading unit, its dependency degree is determined, wherein the dependency degree=number of edge/number of module. With one minimal loading unit in FIG. 7 as example, such as LFG_N3, its dependency degree=number of edge (3)/number of module (4)=3/4. The larger the calculated value of dependency degree is, the higher the dependency degree is, which indicates that relationships among respective modules in the loading unit are much closer. In this embodiment, the larger the value of the dependency degree is, the higher the priority is.

For each minimal loading unit, the number of shared module is determined, wherein the shared module is a module shared between different minimal loading units. In this embodiment, the more the shared module is, the higher the priority is.

For each minimal loading unit, size of the module (i.e., size of file of the module per se) is determined. In this embodiment, the smaller the size of the module is, the higher the priority is.

According to different environments, it is possible to sort the minimal loading unit by one or more among the following factors: Determined Level, Number of Shared Module, Dependency Degree, and Size of Module, and modify sorting rules by adjusting order of the factors, thereby determining the pre-load sequences. For example, the user can, based on practical needs, adjust the order of respective factors listed above to modify the sorting rules.

In another embodiment of analyzing the load flow graph and the module dependency graph to determine pre-load sequences, for each minimal loading unit, the shortest path from it to a root is determined. For each minimal loading unit, its level based on the shortest path from it to a root is determined. For each minimal loading unit, its dependency degree is determined. For each minimal loading unit, the number of shared module is determined. For each minimal loading unit, its interactive operation possibility is determined by analyzing runtime information, wherein the interactive operation possibility=the possibility to browse pages where the related modules are=the sum of the possibility traverse to a given minimal loading unit. The runtime information can be collected from operations of the user at a client device. It should be noted that the interactive operation possibility may also be predicted in advance. And for each minimal loading unit, the size of module is determined.

According to different environments, it is possible to sort the minimal loading unit by one or more among the following factors: Determined Level, Interactive Operation Possibility, Number of Shared Module, Dependency Degree, and Size of Module, and modify sorting rules by adjusting order of the factors, thereby determining the pre-load sequences. The runtime information includes access information of different types of users as collected by one or more client devices. That is to say, the user can dynamically adjust the pre-load sequences according to importance of respective factors.

After the pre-load sequences are determined at step S403, the pre-load profile can be generated based on the determined pre-load sequences at step S404. Specifically, generating a pre-load profile based on the determined pre-load sequences further comprises: based on the determined pre-load sequences, adding a parameter value and additional information for cooperation at runtime, and generating a pre-load profile in a specific format. The additional information includes identification information of a specific user and/or identification information of a specific use requirement. That is to say, the pre-load profile may be customized according to a role or an individual.

Figure 8:
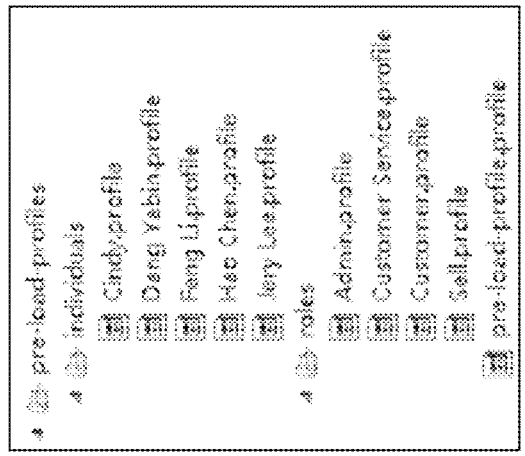
FIG. 8 shows an example of a pre-load profile.

In particular, FIG. 8 shows an example of a pre-load profile on the left. As shown in FIG. 8, the pre-load profile includes a pre-load sequence whose role is "System Manager" and user ID is "Hao Chen".

In addition, FIG. 8 shows customizing and generating a pre-load profile for each user or each role individually on the right.

In addition, the method 400 in the embodiment of the present invention may for example further comprise: executing a build operation based on a build profile, so as to generate a web page file to be deployed on a server.

That is to say, since the web page file needs to be deployed on a server, in order to build the web page file, it needs to further generate a build profile that guides the build process. Then the build operation is executed according to the build profile, the pre-load profile, and a user agent application. This is decided by the particularity of JavaScript application in the build stage. Because, it is not to simply compress respective JavaScript application files to a single compressed file when building with the JavaScript application, instead, variables in the respective JavaScript applications are mixed, and the respective files are combined, thereby generating a compressed file in a specific format. Therefore, in the build stage, it needs to generate a build profile that guides the build process, so that the pre-load order of respective JavaScript can be determined.

The user agent application is provided to the client device, so that the client device can access the pre-load profile, collect runtime information and so on through the user agent application. After the build operation is completed, a web page file to be deployed on a server is generated. Then, the web page file can be deployed to a server.

Accordingly, the electronic apparatus and the method for optimizing web page pre-loading according to the second embodiment of the present invention can perform active pre-loading of the elements in the web page by means of predicting the page browsing order and analyzing correlation of codes of different elements in the page, reduce the time to load a page, and thereby improve use experience of the user.

Hereinafter, a server 900 according to a third embodiment will be described with reference to FIG. 9.

Figure 9:
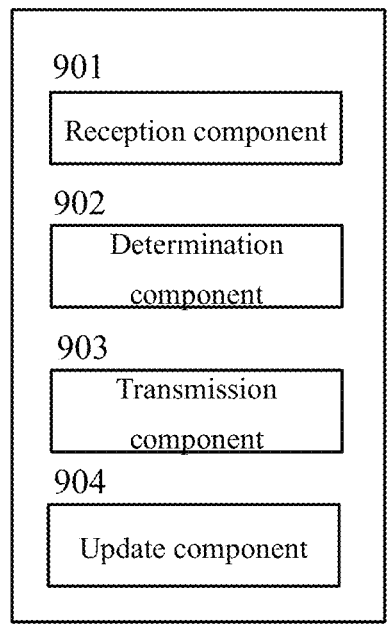
FIG. 9 shows a block diagram of function configuration of a server for optimizing web page pre-loading according to a third embodiment of the present invention.

As shown in FIG. 9, in the server 900 according to the third embodiment, a reception component 901 is configured to receive a web page file, which includes a pre-load profile that defines pre-load sequences of respective modules in the web page file. A determination component 902 is configured to, in response to receipt of a request from a user to access a web page to which the web page file corresponds by a client, determine whether the client has the pre-load profile. And a transmission component 903 is configured to, in response to that the client has the pre-load profile, according to the pre-load request made by the client based on the pre-load profile, transmit respective modules in the web page file to the client.

In addition, the reception component 901 is further configured to receive user use information at runtime transmitted from the client.

In addition, the server 900 further comprises an update component 904 configured to update the pre-load profile based on the user use information.

Figure 10:
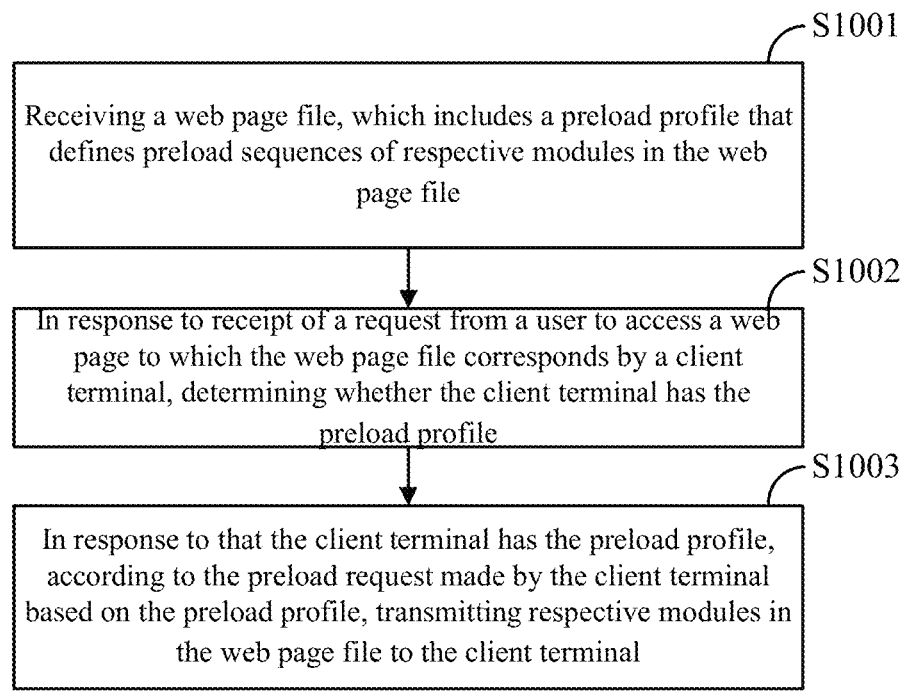
FIG. 10 shows a flow chart of a method for optimizing web page pre-loading as implemented in the server according to the third embodiment of the present invention.

The method for optimizing web page pre-loading as implemented by the server 900 will be described in detail below with reference to FIG. 10. As shown in FIG. 10, the method 1000 comprises the following steps. In step S1001, a web page file is received, which includes a pre-load profile that defines pre-load sequences of respective modules in the web page file. In step S1002, in response to receipt of a request from a user to access a web page to which the web page file corresponds by a client, it is determined whether the client has the pre-load profile. In step S1003, in response to that the client has the pre-load profile, according to the pre-load request made by the client based on the pre-load profile, respective modules in the web page file are transmitted to the client.

Specifically, at step S1001, the server 900 receives a web page file deployed from for example an external electronic apparatus of the electronic apparatus 300, the web page file includes a pre-load profile that defines pre-load sequences of respective modules in the web page file. In addition, the web page file may further include a user agent application.

It should be noted that the pre-load profile may for example be generated by the electronic apparatus 300 executing the above method, the detailed descriptions thereof are omitted here.

The user agent application also is generated by the electronic apparatus 300 for being transmitted to the client to be used.

Next, at step S1002, the server 300 can detect a web page access request (HTTP request) from the client. Upon receipt of a request from a user to access a web page to which the web page file corresponds via a client, it is determined whether the client has the pre-load profile. At this step, the server 300 may for example detect whether the client deploy a web page access request through the user agent application, if the answer is positive, then it can be determined that the client already has the user agent application, and already obtains the pre-load profile.

On the other hand, if the answer is negative, then it can be determined the client may probably access the web page for the first time or the user agent application is not available, thus the pre-load profile and the user agent application need to be transmitted to the client.

Thereafter, at step S1003, in the case that the client has the pre-load profile, in response to the pre-load request made by the client based on the pre-load profile, respective modules in the web page file are transmitted to the client.

At this step, the server 300 may transmit the respective modules to the client in sequence with the minimal loading unit as a unit according to the pre-load request made by the client by the load sequences of respective modules (such as JavaScript application) as prescribed in the pre-load profile. So, when the client receives the web page contents, respective modules are loaded according to the load sequences of the respective modules as prescribed in the pre-load profile.

In addition, the server 300 may further receive user use information at runtime transmitted from the client, and update the pre-load profile based on the user use information.

Specifically, when the client runs the user agent application and executes pre-loading, it can monitor the operations of the user in real time and obtain the runtime information. For example, the frequency that the user accesses a specific module, and the frequency that the user accesses a specific web page and so on.

Thereafter, the client may transmit such runtime information to the server, the server updates the pre-load profile based on such user use information.

Then, when the server 300 receives a request to again access the web page through the client from the user, it can transmit the updated pre-load profile to the client. Thereby, the client can dynamically pre-load modules in the web page according to the adjusted order in the updated pre-load profile. Therefore, the user feels that the speed at which the web page or application that he/she likes is loaded is faster and faster, thereby use experience of the user is improved.

Accordingly, the server and the method for optimizing web page pre-loading according to the embodiment of the present invention can perform active pre-loading of the elements in the web page by means of predicting the page browsing order and analyzing correlation of codes of different elements in the page, reduce the time to load a page, and thereby improve use experience of the user.

Figure 11:
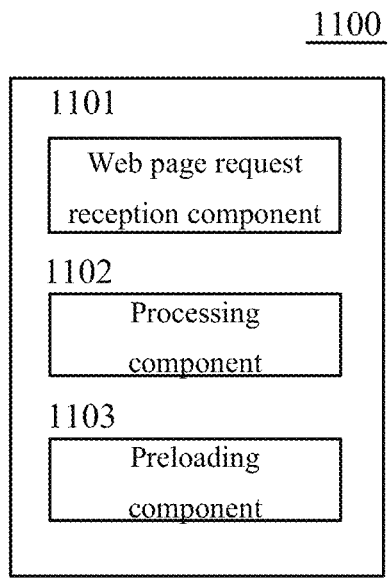
FIG. 11 shows a block diagram of function configuration of a client electronic apparatus for optimizing web page pre-loading according to a fourth embodiment of the present invention.

Hereinafter, the electronic apparatus 1100 according to a fourth embodiment of the present invention will be described with reference to FIG. 11. FIG. 11 shows a block diagram of function configuration of a client electronic apparatus for optimizing web page pre-loading according to a fourth embodiment of the present invention.

As shown in FIG. 11, the electronic apparatus 1100 comprises:
- a web page request reception component 1101 configured to receive a request to access a specific web page from a user;
- a processing component 1102 configured to according to the request, read a pre-load profile corresponding to the specific web page, wherein the pre-load profile defines pre-load sequences of respective modules in the web page file; and
- a pre-loading component 1103 configured to execute pre-loading of the specific web page based on the pre-load profile.

A method 1200 for optimizing web page pre-loading as implemented in the electronic apparatus 1100 will be described below with reference to FIG. 12.

Figure 12:
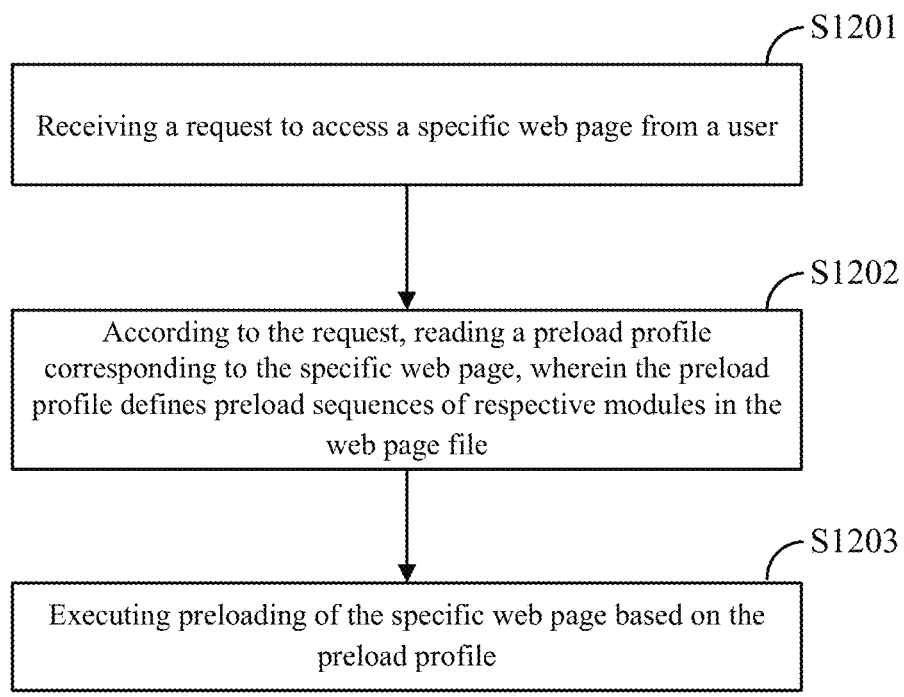
FIG. 12 shows a flow chart of a method for optimizing web page pre-loading as implemented in the electronic apparatus according to the fourth embodiment of the present invention.

As shown in FIG. 12, the method 1200 for optimizing web page pre-loading according to the fourth embodiment comprises:
- step S1201: receiving a request to access a specific web page from a user through a user agent application;
- step S1202: according to the request, reading a pre-load profile corresponding to the specific web page, wherein the pre-load profile defines pre-load sequences of respective modules in the web page file; and
- step S1203: executing pre-loading of the specific web page based on the pre-load profile.

Specifically, at step S1201, the client 1200 may for example access a specific web page through a browser in which a user agent application may be embedded. The user agent application can detect user operation information when the user accesses a web page.

Next, at step S1202, when the user agent application detects the web page access request, a pre-load profile corresponding to the specific web page is read from a buffer or a memory. The pre-load profile defines pre-load sequences of respective modules in a web page file.

It should be noted that the pre-load profile may for example be generated by the electronic apparatus 300 executing the above method, the detailed descriptions are omitted here.

Thereafter, at step S1203, pre-loading of the specific web page may be executed based on the pre-load profile.

Specifically, process of the pre-load processing executed in the client will be described below with reference to FIG. 13.

Figure 13:
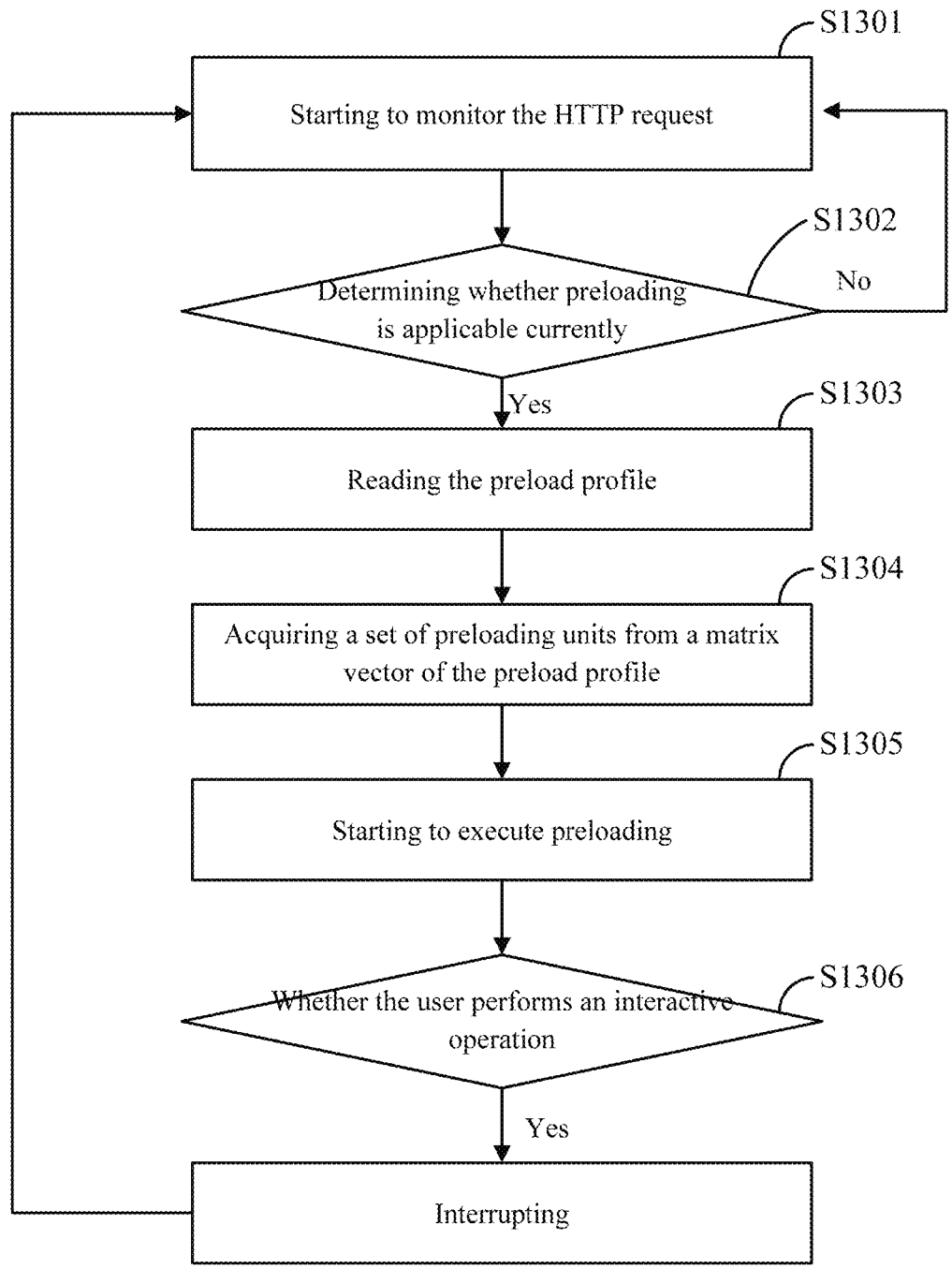
FIG. 13 shows a concrete flow chart of the method for optimizing web page pre-loading as implemented in the electronic apparatus according to the fourth embodiment of the present invention.

As shown in FIG. 13, at step S1301, it starts to monitor the HTTP request made by the user.

Next, at step S1302 it is determined whether pre-loading is applicable currently. In particular, when idle time of the client exceeds a predetermined threshold, it is determined that the electronic apparatus is in an available state currently. For example, it is possible to set a threshold time for the idle time of the client, such as 200 ms. When the idle time of the client exceeds 200 ms, it is determined that the client is idle currently, pre-loading can be executed.

Thereafter, at step S1303, the pre-load profile is read. The pre-load profile is acquired from the server, and corresponds to the web page to which the HTTP request of the user corresponds.

It should be noted that, if reading of the pre-load profile fails, then the pre-load profile corresponding to the web page and the user agent application are received from the server.

Next, at step S1304, a set of pre-loading units may be acquired from a matrix vector of the pre-load profile, that is, a set of minimal loading units expected to be loaded.

Then, at step S1305, it starts to execute pre-loading, thereby the server starts to receive a set of predetermined pre-loading units.

While executing pre-loading, at step S1306, it is determined whether the user performs an interactive operation, in particular, whether the user performs an interactive operation that requires a bandwidth. If the user fails to performs an interactive operation that requires a bandwidth, the operation continues to execute preloading.

When a detection result indicates that the user performs an interactive operation that requires a bandwidth, then execution of the web page pre-loading is interrupted, at step 1307, and the interactive operation of the user is executed immediately, and the processing returns to step S1300.

When the detection result indicates that the user does not perform an interactive operation that requires a bandwidth, execution of the web page pre-loading continues, until the set of units expected to be pre-loaded is loaded completely and successfully.

It should be noted that, when executing web page pre-loading, it is also possible to monitor and make statistics of runtime information of the user during the loading process through the user agent application. The collected user runtime information may for example include the order in which, the time at which, and name of application by which the user performs the interactive operation. The runtime information of the user may be fed back to the server, to facilitate adjusting the order of the pre-loaded contents during a next access of the user.

Figure 14A:
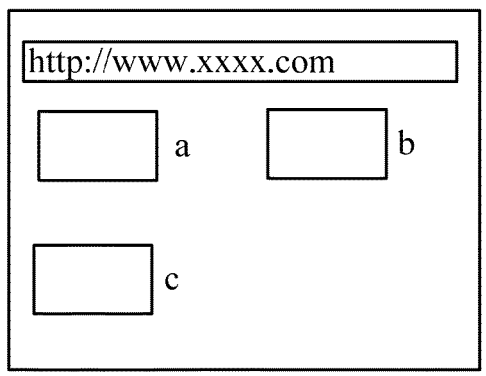
FIGS. 14A and 14B show a diagram of implementation effect of the method for optimizing web page pre-loading according to the fourth embodiment of the present invention.
Figure 14B:
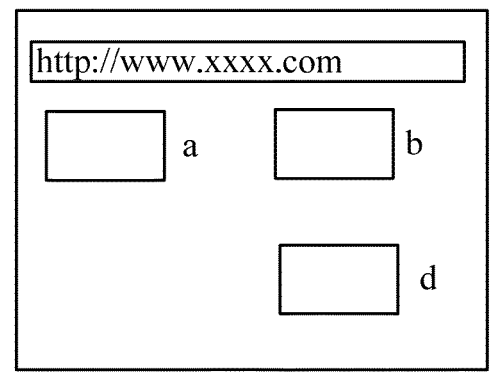

For example, as shown in FIGS. 14A and 14B, FIG. 14A shows when the user first accesses the web page, sequence of the pre-loaded modules is Module a, Module b, and Module c. FIG. 14B shows that when the user again accesses the web page, sequence of the pre-loaded modules is Module a. Module b, and Module d. That is to say, from the user use information collected when the user browses the web page, it is found out that the user performs an interactive operation through Module d. Thus, the analysis result indicates that Module d has a high possibility of being used by the user. Therefore, when the user accesses the web page next time. Module d is pre-loaded, so that the user can first view the contents of Module d so as to operate.

An example of adjusting the pre-load sequences above with respect to user use information of the same single user is described. Likewise, it is also possible to adjust the pre-load sequences with respect to user use information of different users. For example, still with FIGS. 14A and 14B as example, FIG. 14 A may indicate the example of preloading when user A accesses the web page, and FIG. 14B may indicate the example of pre-loading when user B accesses the web page.

Through the user use information of user A and user B, it is found out that user A has a high probability of using Module c, and user B has a high probability of using Module d. Therefore, Module c is pre-loaded when user A accesses the web page, Module d is pre-loaded when user B accesses the web page.

Accordingly, different pre-load sequences are provided for different users, which can provide better use experience to the user.

In addition, pre-loading executed at the client is all executed when the client is idle, thus it will not delay the interactive operation of the user.

Accordingly, the electronic apparatus and the method for optimizing web page pre-loading according to the fourth embodiment of the present invention can perform active pre-loading of the elements in the web page by means of predicting the page browsing order, analyzing correlation of codes of different elements in the page, and capturing an idle gap when the user browses the web page, reduce the time to load a page, and thereby improve use experience of the user.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for optimizing web page pre-loading, the method comprising:

analyzing, by an electronic apparatus, source codes of a web page file to generate a module dependency graph that describes load dependency relationships between respective modules in the web page file, wherein analyzing the source codes of the web page file to generate the module dependency graph further comprises:

analyzing, by the electronic apparatus, the source codes of the web pane file to determine nodes and edges in the web Dane file, wherein each node indicates a module in the web page file, the edges include real edges and virtual edges, each real edge has a direction, a real edge from one node to another node indicates that the one node always depends on the another node, each virtual edge has a direction, a virtual edge from one node to another node indicates that the one node depends on the another node only in certain conditions; and generating, by the electronic apparatus, the module dependency graph based on the determined nodes and edges;

generating, by the electronic apparatus, a load flow graph that indicates load flows of respective modules in the web page file based on the module dependency graph, wherein generating the load flow graph based on the module dependency graph further comprises:

removing, by the electronic apparatus, virtual edges from the module dependency graph to obtain a corrected module dependency graph:

identifying a set of roots from the corrected module dependency graph:

for each root in the set of roots, identifying, by the electronic apparatus, its transitive closure in the corrected module dependency graph;

for each identified transitive closure, generating, by the electronic apparatus, a node in the load flow graph, the nodes in the load flow graph including all modules in the transitive closure;

for each pair of nodes in the load flow graph, if there is at least one virtual edge in the module dependency graph from a module in one node to a module in another node, generating, by the electronic apparatus, a directional edge from the one node to the another node; and generating, by the electronic apparatus, the load flow graph with the node in the load flow graph as a minimal loading unit;

analyzing, by the electronic apparatus, the load flow graph and the module dependency graph to determine pre-load sequences of the respective modules in the web page file;

generating, by the electronic apparatus, a pre-load profile based on the determined pre-load sequences;

deploying, by the electronic apparatus, the web page file including the preload profile that defines the pre-load sequences of the respective modules in the web page file to a server;

receiving, by a server, the web page file from the electronic apparatus;

in response to receipt of a request from a user to access a web page corresponding to the web page file via a client electronic apparatus, determining, by the server, whether the client electronic apparatus has the pre-load profile; and in response to the client electronic apparatus having the pre-load profile, according to the pre-load request made by the client electronic apparatus based on the pre-load profile, transmitting, by the server, respective modules in the web page file to the client electronic apparatus.

2. The method according to claim 1, wherein analyzing the load flow graph and the module dependency graph to determine the pre-load sequences further comprises:

for each minimal loading unit, sorting, by the electronic apparatus, the minimal loading unit by one or more among the factors of "Its Shortest Path to Root", "Interactive Operation Possibility", "Number of Shared Module", "Dependency Degree", and "Size of Module", and modifying sorting rules by adjusting order of the factors, thereby determining the pre-load sequences.

3. The method according to claim 2, wherein the "Interactive Operation Possibility" is determined based on acquired runtime information, which includes access information of different types of users as collected by one or more client devices.

4. The method according to claim 1, wherein generating the pre-load profile based on the determined pre-load sequences further comprises:

based on the determined pre-load sequences, adding, by the electronic apparatus, a parameter value and additional information for cooperation at runtime, and generating, by the electronic apparatus, a pre-load profile in a specific format, wherein the additional information includes identification information of a specific user and/or identification information of a specific use requirement.

5. The method according to claim 1, further comprising:

executing, by the electronic apparatus, a build operation based on a build profile that guides a build process and the pre-load profile, so as to generate a web page file to be deployed.

6. The method according to claim 1, further comprising:
in response to the client failing to have the pre-load profile, transmitting, by the server, the pre-load profile to the client electronic apparatus.

7. The method according to claim 1, further comprising:
receiving, by the server, user use information at runtime transmitted from the client electronic apparatus; and
updating, by the server, the pre-load profile based on the user use information.

8. The method according to claim 1, further comprising:
receiving, by the client electronic apparatus, a request to access a specific web page from a user;
according to the request, reading, by the client electronic apparatus, a pre-load profile corresponding to the specific web page, wherein the pre-load profile defines the pre-load sequences of the respective modules in the web page file; and
executing, by the client electronic apparatus, pre-loading of the specific web page based on the pre-load profile.

9. An apparatus for optimizing web page pre-loading, the apparatus comprising:
a processor; and
a memory coupled to the processor, wherein the memory comprises instructions which, when executed by the processor, cause the processor to:
analyze source codes of a web page file to generate a module dependency graph that describes load dependency relationships between respective modules in the web page file, wherein the instructions to analyze the source codes of the web page file to generate the module dependency graph further cause the processor to:
analyze the source codes of the web page file to determine nodes and edges in the web page file, wherein each node indicates a module in the web page file, the edges includes real edges and virtual edges, each real edge has a direction, a real edge from one node to another node indicates that the one node always depends on the another node, each virtual edge has a direction, a virtual edge from one node to another node indicates that the one node depends on the another node only in certain conditions; and
generate the module dependency graph based on the determined nodes and edges;
generate a load flow graph that indicates load flows of respective modules in the web page file based on the module dependency graph, wherein the instructions to generate the load flow graph based on the module dependency graph further cause the processor to:
remove virtual edges from the module dependency graph to obtain a corrected module dependency graph;
identify a set of roots from the corrected module dependency graph;
for each root in the set of roots, identify its transitive closure in the corrected module dependency graph;
for each identified transitive closure, generate a node in the load flow graph, the node in the load flow graph including all modules in the transitive closure;
for each pair of nodes in the load flow graph, if there is at least one virtual edge in the module dependency graph from a module in one node to a module in another node, then generate a directional edge from the one node to the another node; and
generate the load flow graph with the node in the load flow graph as a minimal loading unit;
analyze the load flow graph and the module dependency graph to determine pre-load sequences of the respective modules in the web page file;
generate a pre-load profile based on the determined pre-load sequences; and
deploy the web page file including the preload profile that defines the pre-load sequences of the respective modules in the web page file to a server, wherein, in response to receipt of a request from a user to access a web pane corresponding to the web page file via a client electronic apparatus, the server:
determines whether the client electronic apparatus has the pre-load profile; and
in response to that the client electronic apparatus having the pre-load profile, according to the pre-load request made by the client electronic apparatus based on the pre-load profile, transmits respective modules in the web page file to the client electronic apparatus.

10. The apparatus according to claim 9, wherein the instructions to analyze the load flow graph and the module dependency graph to determine the pre-load sequences further to:
for each minimal loading unit, sort the minimal loading unit by one or more among the factors of "Its Shortest Path to Root", "Interactive Operation Possibility", "Number of Shared Module", "Dependency Degree", and "Size of Module", and modify sorting rules by adjusting order of the factors, thereby determining the pre-load sequences.

11. The apparatus according to claim 9, wherein the instructions to generate the pre-load profile based on the determined pre-load sequences further to:
based on the determined pre-load sequences, add a parameter value and additional information for cooperation at runtime, and generate a pre-load profile in a specific format, wherein the additional information includes identification information of a specific user and/or identification information of a specific use requirement.

12. The apparatus according to claim 9, wherein, in response to receiving user use information at runtime transmitted from the client electronic apparatus the server:
updates the pre-load profile based on the user use information.

13. The apparatus of claim 9, wherein in response to receiving a request to access a specific web page from the user, the client electronic apparatus:
according to the request, reads the pre-load profile corresponding to the specific web page, wherein the pre-load profile defines the pre-load sequences of the respective modules in the web page file; and
executes pre-loading of the specific web page based on the pre-load profile.

14. A computer program product comprising a computer readable storage medium having a computer readable program stored therein, wherein the computer readable program, when executed on a computing device, causes the computing device to:
analyze source codes of a web page file to generate a module dependency graph that describes load dependency relationships between respective modules in the web page file, wherein the computer readable program to analyze the source codes of the web page file to generate the module dependency graph further causes the computing device to:
analyze the source codes of the web page file to determine nodes and edges in the web page file, wherein each node indicates a module in the web page file, the edges includes real edges and virtual edges, each real edge has a direction, a real edge from one node to another node indicates that the one node always depends on the another node, each virtual edge has a direction, a virtual edge from one node to another node indicates that the one node depends on the another node only in certain conditions; and generate the module dependency graph based on the determined nodes and edges;

generate a load flow graph that indicates load flows of respective modules in the web page file based on the module dependency graph, wherein the computer readable program to generate the load flow graph based on the module dependency graph further causes the computing device to:

remove virtual edges from the module dependency graph to obtain a corrected module dependency graph;

identify a set of roots from the corrected module dependency graph;

for each root in the set of roots, identify its transitive closure in the corrected module dependency graph;

for each identified transitive closure, generate a node in the load flow graph, the node in the load flow graph including all modules in the transitive closure;

for each pair of nodes in the load flow graph, if there is at least one virtual edge in the module dependency graph from a module in one node to a module in another node, then generate a directional edge from the one node to the another node; and generate the load flow graph with the node in the load flow graph as a minimal loading unit;

analyze the load flow graph and the module dependency graph to determine pro-load sequences of the respective modules in the web page file;

generate a pre-load profile based on the determined pre-load sequences; and deploy the web page file including the preload profile that defines the pre-load sequences of the respective modules in the web page file to a server, wherein, in response to receipt of a request from a user to access a web page corresponding to the web page file via a client electronic apparatus, the server:

determines whether the client electronic apparatus has the pre-load profile; and in response to that the client electronic apparatus having the pre-load profile, according to the pre-load request made by the client electronic apparatus based on the pre-load profile, transmits respective modules in the web page file to the client electronic apparatus.

* * * * *